US 6,602,633 B1

(12) United States Patent
Ohbayashi et al.

(10) Patent No.: US 6,602,633 B1
(45) Date of Patent: Aug. 5, 2003

(54) CRUSH TYPE PRESSURE DETECTING DEVICE, RECHARGEABLE BATTERY WITH PRESSURE DETECTING DEVICE, AND PORTABLE ELECTRONIC DEVICE

(75) Inventors: Yoshiaki Ohbayashi, Nara (JP); Keiji Mine, Yao (JP); Seisaku Hirai, Yao (JP)

(73) Assignee: Hosiden Corporation, Yao (JP)

( * ) Notice: Subject to any disclaimer, the term of this patent is extended or adjusted under 35 U.S.C. 154(b) by 0 days.

(21) Appl. No.: 09/660,511

(22) Filed: Sep. 12, 2000

(30) Foreign Application Priority Data

Sep. 13, 1999 (JP) .......................... 11-259216
Dec. 15, 1999 (JP) .......................... 11-356063

(51) Int. Cl.$^7$ .......................... H01M 2/12; G01L 1/00; H01H 85/00; H01H 73/00
(52) U.S. Cl. .......................... 429/82; 429/53; 429/56; 429/61; 429/72; 73/12.01; 73/763; 73/774; 361/115; 200/61.08
(58) Field of Search .......................... 73/12.01, 28.03, 73/23.27, 763, 760, 774; 439/604; 361/102, 115; 200/61.08; 429/61, 53, 56, 72, 82

(56) References Cited

U.S. PATENT DOCUMENTS 5,705,290 A * 1/1998 Azema .................. 429/53
5,773,775 A * 6/1998 Azema .................. 200/61.08
6,335,109 B1 * 1/2002 Takahashi et al. .......... 429/7
6,472,097 B1 * 10/2002 Ohbayashi et al. .......... 429/82

FOREIGN PATENT DOCUMENTS

JP          01092603 A   *  4/1989  .......... G01B/7/18

* cited by examiner

Primary Examiner—Patrick Ryan
Assistant Examiner—Gregg Cantelmo
(74) Attorney, Agent, or Firm—Armstrong, Westerman & Hattori, LLP

(57) ABSTRACT

A crush type pressure detecting device less in occurrence of malfunction, simple in structure, and inexpensive to manufacture is presented. On a crush plate 120 made of ceramics or the like, a conductor path 130 is formed, for example, in linear or U-shape, and electrodes 131 are provided at both ends. Both ends of the crush plate 120 are inserted into a holder 110 made of plastic or printed board so as to support at both sides. An opening 111 is provided in the holder 110 to expose the electrode 131, thereby obtaining a crush type pressure detecting device 100 of the invention. Terminal plates 140 are connected to the electrodes 131 of this detecting device 100, and the terminal plates 140 are used as mounting members, and are disposed in contact with the object to be detected, for example, the outer wall of a housing 210 of a rechargeable battery 200. One terminal plate 140 is connected to the current collector in the housing 210, and other terminal plate 140 is left over outside the housing as an output electrode 240, and the rechargeable battery 200 having the crush type pressure detecting device 100 according to the invention is obtained.

16 Claims, 22 Drawing Sheets

(a)

(b)

(a)

(b)

(a)

(b)

(a)

(b)

(a)

(b)

(a)

(b)

(a)

(b)

CRUSH TYPE PRESSURE DETECTING DEVICE, RECHARGEABLE BATTERY WITH PRESSURE DETECTING DEVICE, AND PORTABLE ELECTRONIC DEVICE

TECHNICAL FIELD

The present invention relates to a crush type pressure detecting device, a rechargeable battery with pressure detecting device, and a portable electronic device. More particularly, it relates to a pressure detecting device capable of detecting deformation due to a pressure change in a simple structure and preventing further danger, and a rechargeable battery and a portable electronic device using the same.

PRIOR ART

Hitherto, in electronic devices such as portable telephone and video camera, rechargeable batteries (secondary batteries) such as lithium ion battery and nickel-cadmium battery have been widely used. In these types of rechargeable batteries, when falling in overcharged state or short-circuited state, for example, due to trouble or wrong use of electronic device, the inside of the battery is heated, the liquid electrolyte is decomposed to generate gas, and the internal pressure of the battery rises, which may lead to an explosion. To prevent such risk, the rechargeable batteries are provided with various types of pressure detecting devices (refer to Japanese Laid-open Patent No. 11-111263, etc.), and a typical type of such devices is shown in FIG. 22.

In a pressure detecting device 500, a conductor path 520 of a thin film of ceramics or the like is formed on a crush plate 510 which could be easily broken by deformation stress. The pressure detecting device 500 is disposed in contact with the side wall of a housing filled with liquid electrolyte, and each of the electrodes provided at both ends of the conductor path 520 are electrically connected to a current collector and an output electrode in the housing.

In the pressure detecting device 500, when the battery internal pressure increases, the housing expands outwardly, and deformation stress is applied to the crush plate 510. The crush plate 510 is broken when it becomes unable to withstand the stress. As a result, the conductor path 520 is broken, and the charge circuit or discharge circuit which also serves as a protective circuit is cut off. Thus, explosion of the rechargeable battery can be prevented.

In said pressure detecting device, however, since the crush plate 510 forming the conductor path 520 is disposed in direct contact with the side wall of the housing, to enhance the sensitivity of the device, the crush plate 510 itself must be increased in size. Accordingly, using ceramics or the like for the manufacturer of the crush plate 510 has been the cause of increasing the cost. In addition, since the conductor path 520 is formed on the crush plate 510 made of ceramics, its electrical resistance is high, and it has a serious effect on consumption of the battery. On the other hand, there has been a problem that the crush plate 510, if increased in size, becomes easier to warp and is broken even by a slight deformation stress and yet easily affected by drop impact thereby losing its reliability.

Also, alumina ceramics has been used for the crush plate 510, while conductive metal paste comprising a metal of low specific resistance such as silver or copper has been used for the conductor path 520. The burning temperature of alumina ceramics is greatly different from the burning temperature of silver paste or copper paste. Therefore, it is necessary to repeat the burning process two times, that is, burning at the burning temperature (about 1600° C.) of alumina ceramics to form the crush plate 510, and the subsequent burning at the burning temperature (about 1000° C.) of conductive metal paste to form the conductor path 520. Also, there has been a problem that, to form both the conductor path 520 and the crush plate 510 at one time, it is necessary to use a highly conductive metal such as tungsten whose burning temperature is high, causing considerable increase of the manufacturing cost.

Specifically, when alumina ceramics is used, the plate must be designed to have a thickness of over 0.3 mm to make it hard to warp in burning, and this has been a hindrance to the manufacture of thinner rechargeable batteries. Also, since alumina ceramics is too high in strength, it is necessary to adjust the strength by providing the crush plate 510 with slit 530 as shown in FIG. 22 to make the crush plate easier to break.

The present invention is devised in the light of the problems of the prior art mentioned above, and it is the primary object of the invention to provide highly reliable crush type pressure detecting devices which can be manufactured at low cost.

SUMMARY OF THE INVENTION

A crush type pressure detecting device of the invention comprises a crush plate forming a conductor path thereon, a holder for holding the crush plate, and a pair of electrodes conducting with the conductor path. In the crush type pressure detecting device, preferably, the crush plate is provided with an easily broken portion such as V-groove crossing with, for example, the conductor path. The holder holds the crush plate at both sides, or the holder is a plate, and the crush plate is put on this holder.

When the holder is a plate, preferably, a notch is formed in at least a part of the conductor path forming region of the crush plate of the holder. A cover may be placed on the holder by exposing the crush plate.

In the crush type pressure detecting device, preferably, the conductor path is formed in a U-shape. The crush plate is made of ceramics or conductive material, and preferably serves also as a conductor path. The holder is preferably a printed board.

In other crush type pressure detecting device of the present invention, a conductor path is formed on a crush plate which could be broken by deformation stress, and it is characterized in that the crush plate is made of glass ceramics. Preferably an electrode pad is disposed on the other side opposite the conductor path of the crush plate, and there is provided conduction between the conductor path and the electrode through a conductive portion formed inside a through-hole created in said crush plate. It is desirable that another crush plate be placed on the crush plate with the conductor path formed thereon.

Another crush type pressure detecting device of the present invention comprises a crush plate which could be broken by deformation stress, a conductor path formed on said crush plate, and a pair of holders which hold at the sides the crush plate, and it is characterized in that the crush plate is made of glass ceramics. It is preferred to use, as the holder, a thin plate such as a printed circuit board, a glass ceramic plate and an alumina ceramic plate. Then preferably the electrode pad is disposed on the printed circuit board and there is provided conduction between the electrode pad and the conductor path through the circuit on the printed circuit board. It is desirable that the length of the crush plate be set to less than ⅓ of the overall length of the crush type pressure detecting device.

In these crush type pressure detecting devices, preferably the conductor path is formed by burning conductive metal paste whose burning temperature is nearly the same as the crush plate burning temperature.

A rechargeable battery with pressure detecting device of the present invention comprises a rechargeable battery provided with a positive or negative collector inside a case and with an output electrode electrically connected to said collector and a crush type pressure detecting device, and it is characterized in that the collector and the output electrode are electrically connected to each other through said crush type pressure detecting device. In the rechargeable battery with pressure detecting device, a laminate film case is preferably used.

The portable electronic device of the invention is a portable electronic device having a rechargeable battery, and the rechargeable battery is the rechargeable battery of the invention.

REFERENCE NUMERALS

Figure 1:
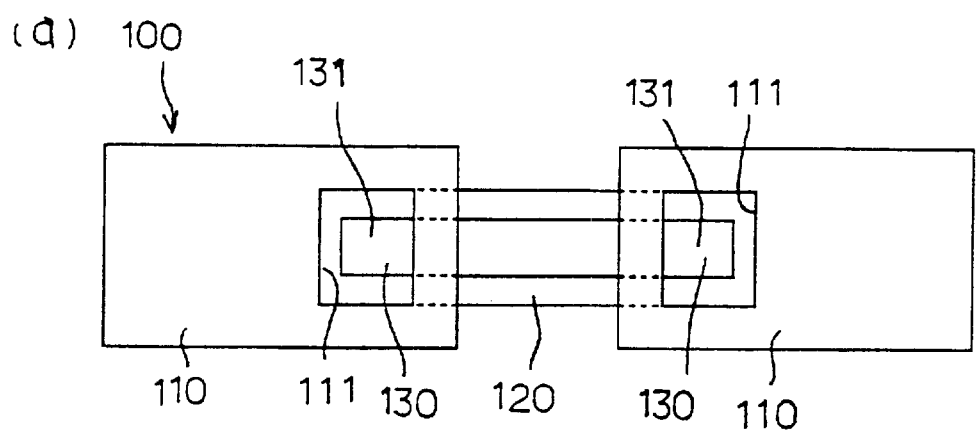
FIG. 1 is a schematic diagram showing a crush type pressure detecting device in an embodiment of the invention, in which (a) is its plan view and (b) is its side view.
Figure 1:
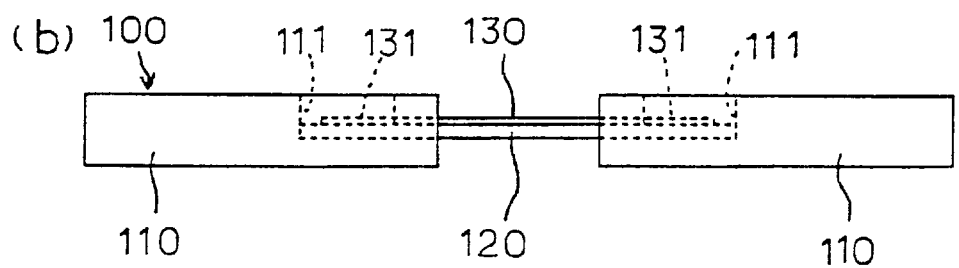

100 Crush type pressure detecting device
110 Holder
111 Opening for pulling out electrode
112 Notch
113 Circuit pattern
120 Crush plate
121 Easily broken portion
130 Conductor path
131 Electrode
140 Terminal plate
150 Cover
151 Opening for exposing crush plate
200 Rechargeable battery
210 Housing
211 Sealing body
220 Terminal block
230 Seal unit
240 Output electrode

EMBODIMENTS OF THE INVENTION

Figure 4:
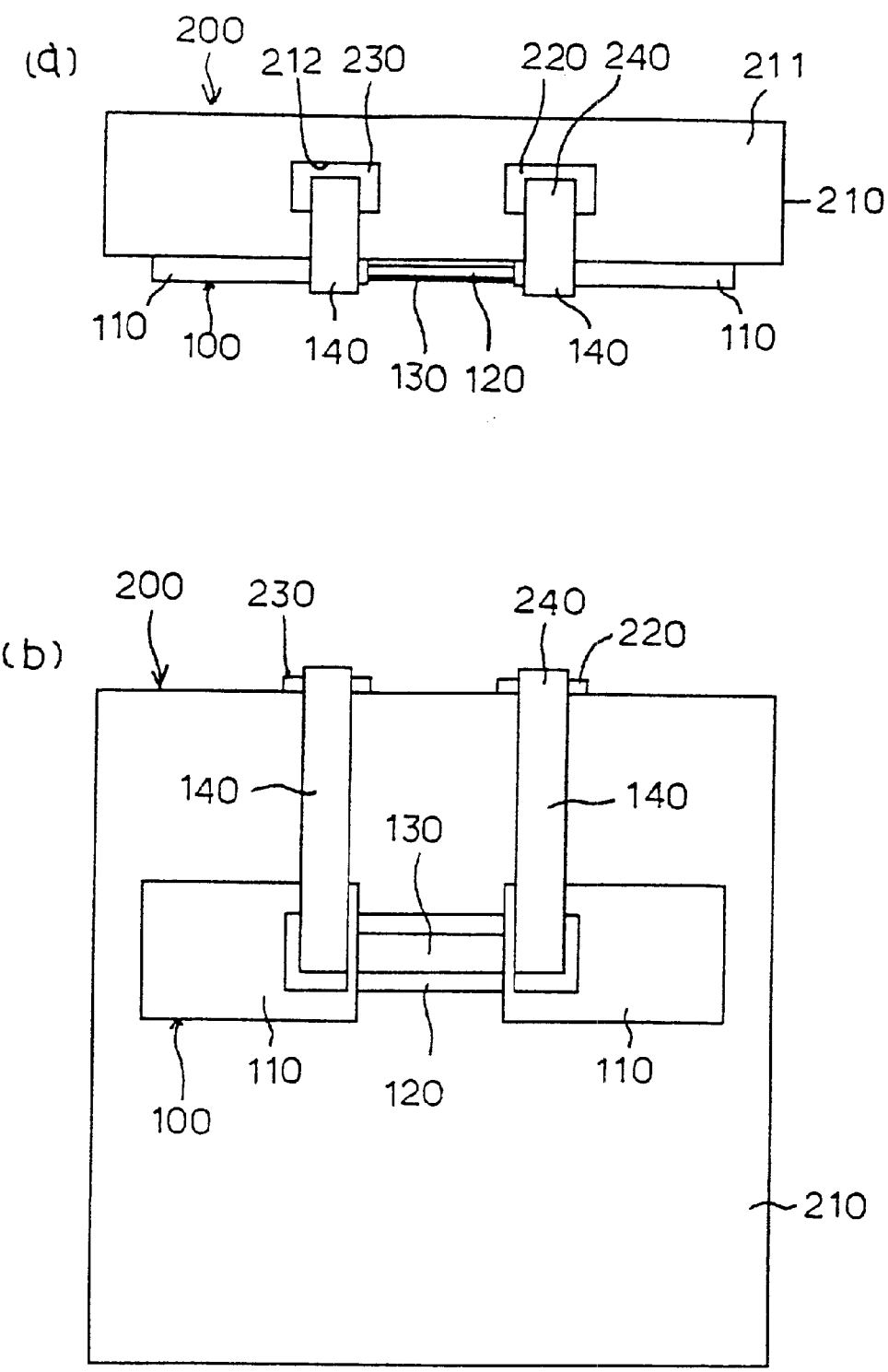
FIG. 4 is a diagram showing a rechargeable battery of the invention having the crush type pressure detecting device, in which (a) is its plan view and (b) is its side view.

A crush type pressure detecting device 100 of the invention comprises, as shown in FIG. 1, a crush plate 120 having a conductor path 130 formed thereon, a holder 110 for holding the crush plate 120 at both sides, and a pair of electrodes 131 connected electrically to the conductor path 130. The crush plate 120 is disposed at the side of a housing 210 of a rechargeable battery 200, for example, as shown in FIG. 4, and is designed to be broken by deformation of the side of the housing 210. Therefore, it is preferably made of a material which is easily broken by a relatively low shearing stress, such as ceramic board.

The thickness or size of the crush plate 120 is not particularly defined, and may be set properly depending on the object to be detected, but the sensitivity may be enhanced by forming thinly or forming the crush plate 120 longer in the lateral direction.

The conductor path 130 is the core of the pressure detecting device 100, and by the rupture of the crush plate 120, the conductor path 130 is broken, and the conduction between the pair of electrodes 131 is cut off. That is, in the pressure detecting device 100 of the invention, deformation of the object caused due to increase in internal pressure of the object or the like is transmitted to the crush plate 120, and when the crush plate 120 is broken, the conduction of the conductor path 130 is cut off, so that the function as the pressure detecting device 100 is exhibited. Therefore, the conductor path 130 must be broken together with the crush plate 120, and it is formed, for example, by depositing a conductive metal or printing a conductive metal paste on the crush plate 120.

Figure 2:
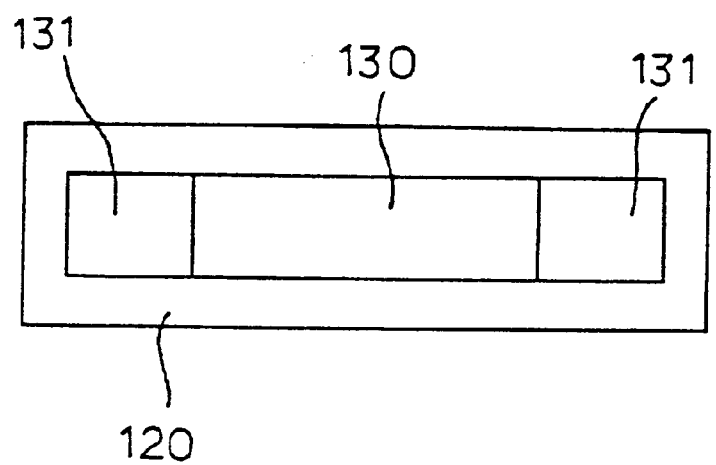
FIG. 2 is a diagram showing a forming pattern of conductor path in the crush type pressure detecting device.

Since the conductor path 130 must be broken together with the crush plate 120, it is formed nearly in the central region (easily broken position) of the crush plate 120. Therefore, in the pressure detecting device 100 in FIG. 1, it is formed linearly, almost from end to end of the crush plate 120 as shown in FIG. 2. Or, at both ends of the conductor path 130, electrodes 131 are formed integrally with the conductor path 130.

The crush plate 120 thus forming the conductor path 130 has a holder 110. The holder 110 is for holding the crush plate 120 and fixing it to the object to be detected, and in the pressure detecting device 100 in FIG. 1, it is disposed so as to hold the crush plate 120 at both sides. The holder 110 is required to transmit the deformation of the object directly to the crush plate 120, and its material is preferred to be rigid, such as plastic and printed board. It is also preferred to use an insulating material to keep insulation from the conductor path 130 or the object.

The method of holding the crush plate 120 on the holder 110 is not particularly specified, but, as shown in FIG. 1, part of the crush plate 120 is inserted or press-fitted into the holder 110 and fixed. Or it may be adhered and fixed to the surface of the holder 110. Further, an opening 111 for lead-out of the electrode 131 is provided in the holder 110. At this time, it is preferred to keep the interval of both holders 110 as wide as possible for enhancing the sensitivity.

Figure 3:
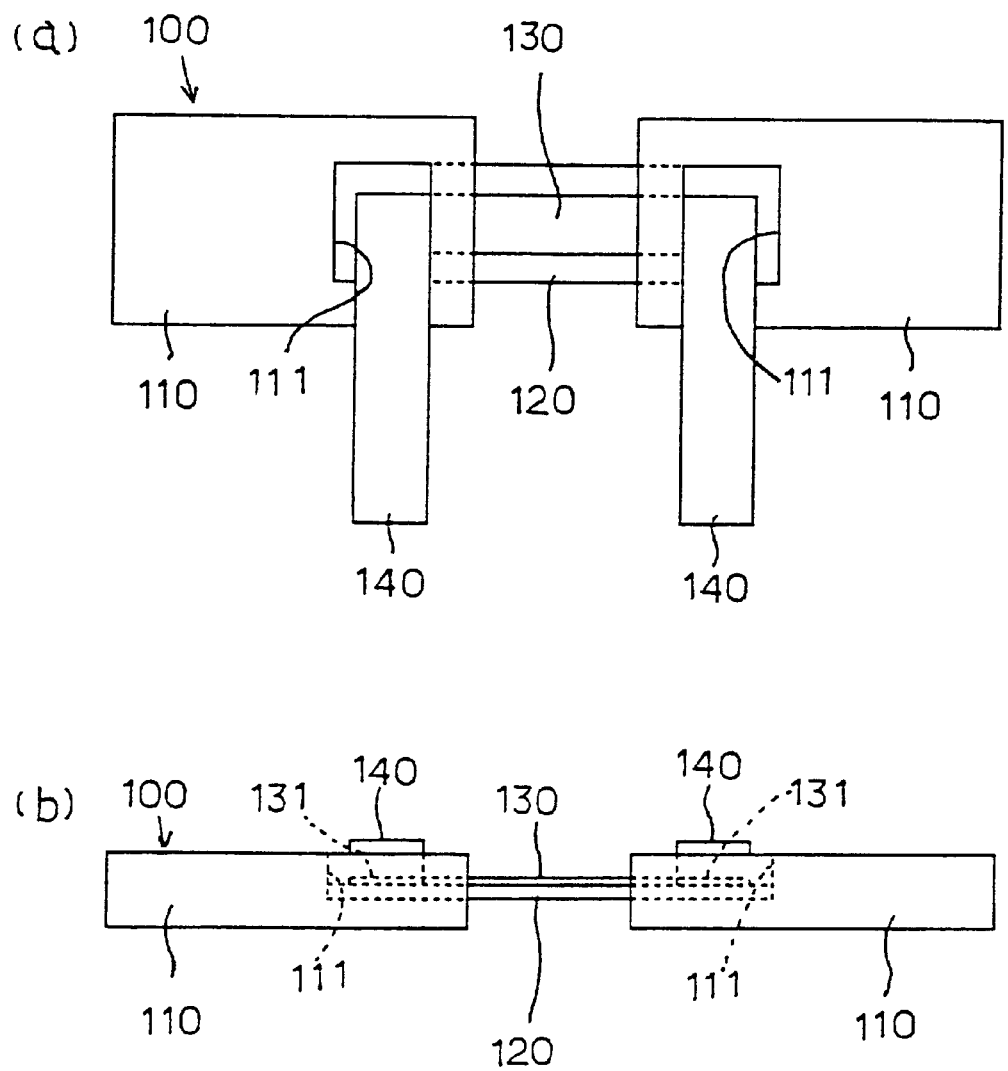
FIG. 3 is an explanatory diagram showing a manner of pulling out the electrode in the crush type pressure detecting device, in which (a) is its plan explanatory diagram and (b) is its side explanatory diagram.

In the crush type pressure detecting device 100 having such structure, to detect the conduction of the conductor path 130, the electrode 131 must be led outwardly and connected electrically to, for example, the external terminal of the detecting circuit. Various methods are considered as the manner of pulling out, and in a method shown in FIG. 3, for example, a terminal plate 140 made of a conductive metal plate is used. The terminal plate 140 is soldered and fixed to the electrode 131, and electric conduction is maintained. By using such terminal plate 140 made of metal plate, the terminal plate 140 itself functions as a mounting member, and it can be easily attached to the object to be detected.

This detecting device 100 is provided in the object which is deformed by internal pressure, such as a rechargeable battery 200 involving the risk of explosion. FIG. 4 is a schematic view showing the rechargeable battery 200 incorporating this detecting device 100. The rechargeable battery 200 has a housing (jacket) 210 filled with liquid electrolyte, and a current collector (not shown) of positive electrode (or negative electrode) is contained in the housing 210. The housing 210 is conductive, and serves also as negative electrode (or positive electrode). At the upper end opening of the housing 210, a metal sealing body 211 is fitted air-tightly by laser welding or the like, and the inside is filled with liquid electrolyte. The sealing body 211 has an opening 212 for inserting the terminal plate 140 for connecting the current collector and detecting device 100. The opening 212 is enclosed with a seal unit 230 made of plastics or other insulating material. An output electrode 240 is formed on the top of the sealing body 211 through a terminal block 220 made of plastics or other insulating material.

In this rechargeable battery 200, two terminal plates 140 play the role of mounting members, and the detecting device 100 is installed by fixing the back side (or face side) of the holder 110 to the side wall of the housing 210, and folding and bending each terminal plate 140 at the upper peripheral edge of the housing 210. One terminal plate 140 is inserted into the housing 210 through the opening 212 of the sealing body 211, and is connected electrically to the current collector in the housing 210. Other terminal plate 140 is fixed to the terminal block 220, and forms the output electrode 240. At this time, the holder 110 must contact securely with the side wall of the housing 210, and it is preferred to fix to the side wall of the housing 210 by using adhesive or the like.

In this rechargeable battery 200, if the liquid electrolyte is decomposed by overcharging or the like and the internal pressure builds up, and the housing 210 expands to outside, the crush plate 120 can no longer withstand the stress and is broken. As a result, the conductor path 130 is ruptured, and the conduction between the current collector and output electrode 240 is cut off, and charging stops. Thus, explosion of the rechargeable battery 200 is prevented.

In the crush type pressure detecting device 100 of the invention, as the crush plate 120 is crushed, deformation of the object can be detected, and at this time, since the deformation of the object is transmitted to the crush plate 120 through the holder 110, the size of the crush plate 120 may be reduced. As a result, the amount of ceramics used is smaller, so that it can be presented at lower cost.

Since the crush plate 120 is smaller, warp of the crush plate 120 itself can be suppressed, and malfunction hardly occurs.

Further, as the crush plate 120 is smaller in size, the conductor path 130 is shorter, the resistance is smaller, and the current loss by detecting device 100 can be reduced. In this embodiment, in particular, this effect is outstanding because the conductor path 130 is provided linearly.

Figure 5:
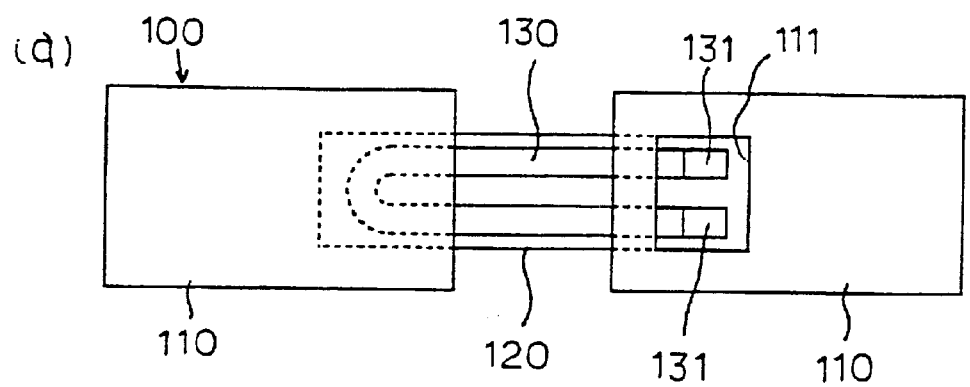
FIG. 5 is a schematic diagram showing a crush type pressure detecting device in other embodiment of the invention, in which (a) is its plan view and (b) is its side view.
Figure 5:
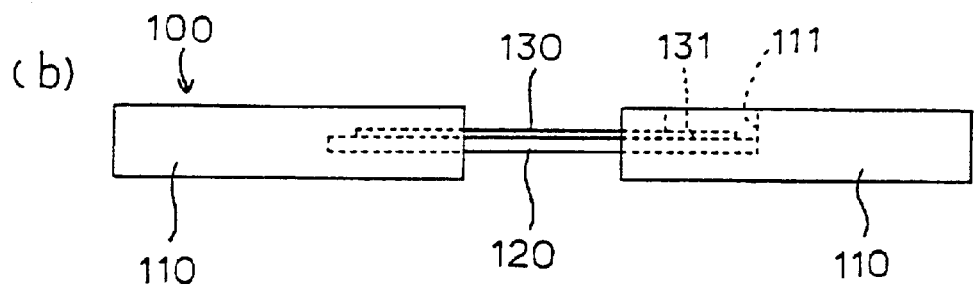
Figure 6:
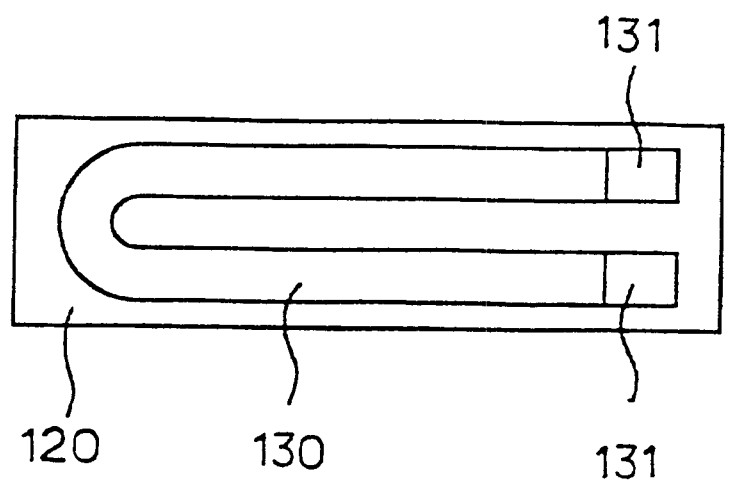
FIG. 6 is a plan view showing a forming pattern of conductor path in the crush type pressure detecting device.

Not limited to the foregoing embodiment, the crush type pressure detecting device 100 may be realized in various embodiments. The detecting device 100 shown in FIG. 5 is nearly same as the detecting device 100 shown in FIG. 1 in structure, except that the conductor path 130 of this detecting device 100 is formed in U-shape as shown in FIG. 6 and elsewhere. Since the conductor path 130 must be broken together with the crush plate 120, in this detecting device 100, it is preferred to form a U-turn, at least from one end of the crush plate 120, over the central region of the crush plate 120.

Figure 7:
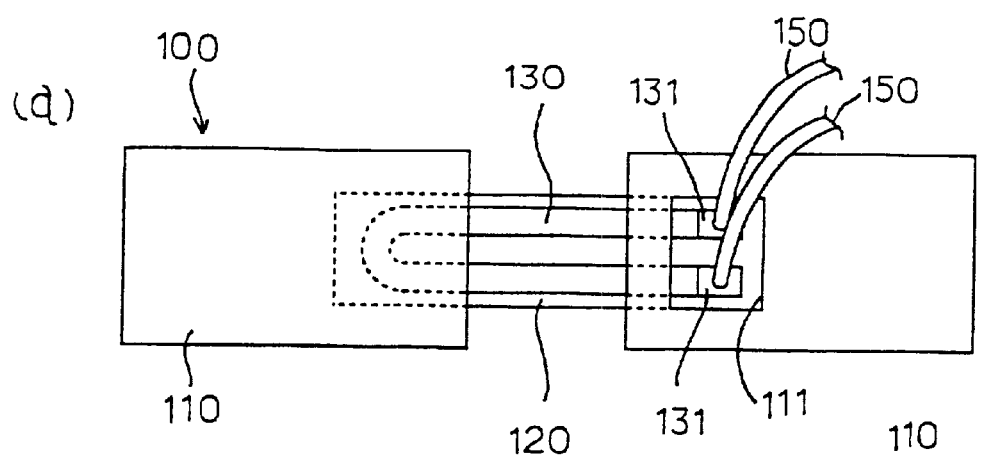
FIG. 7 is an explanatory diagram showing a manner of pulling out the electrode in the crush type pressure detecting device, in which (a) is its plan explanatory diagram and (b) is its side explanatory diagram.
Figure 7:
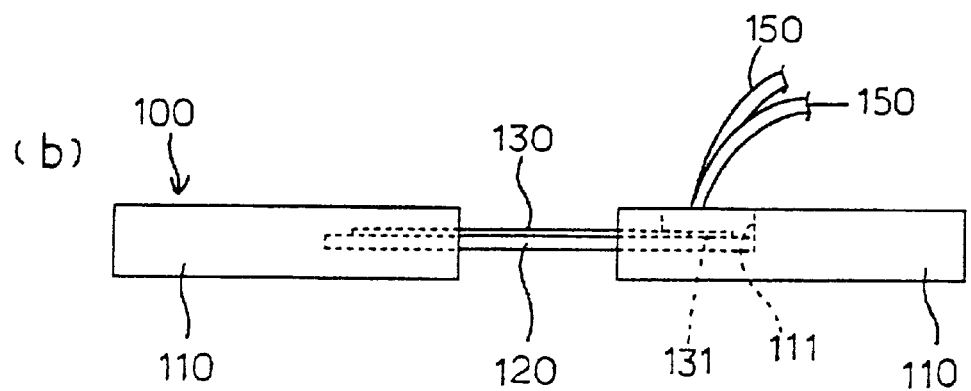

In the detecting device 100, since the electrode 131 is formed at the same side as the crush plate 120, to lead outwardly the electrode 131, a lead wire 150 is preferably used, for example, as shown in FIG. 7. In this detecting device 100, the holder 110 is fixed to the object to be detected by using adhesive or the like. Of course, as shown in FIG. 4, the electrode 131 may be led outwardly by using the terminal plate 140.

In this detecting device 100, since the conductor path 130 is formed in U-shape, the conductor path 130 is broken more easily. As a result, even in the case of a small deformation due to pressure elevation of the object, it is easier to detect the signal.

Figure 8:
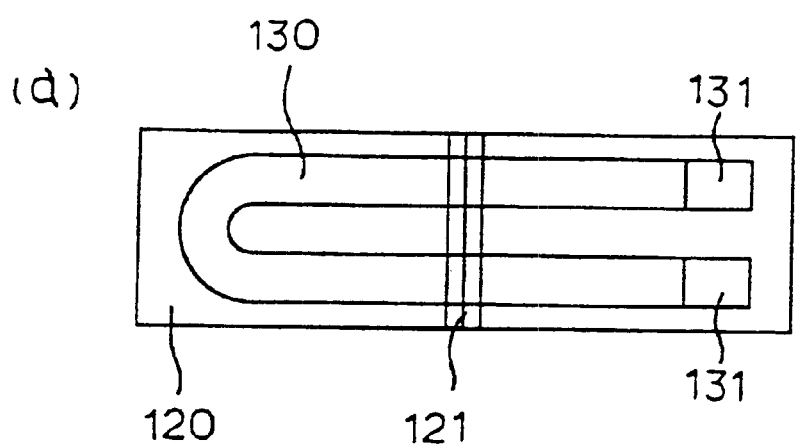
FIG. 8 is a schematic diagram showing a crush plate of a crush type pressure detecting device in another embodiment of the invention, in which (a) is its plan view and (b) is its side view.
Figure 8:
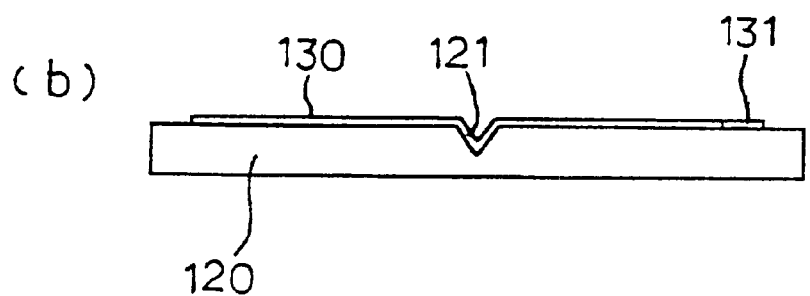

In the crush plate 120 shown in FIG. 8, a V-groove is formed as an easily broken portion 121 in the center of the crush plate 120, and the conductor path 130 is formed to cross with the V-groove. By thus forming the V-groove to cross with the conductor path 130 and forming the easily broken portion 121 in the crush plate 120, the crush plate 120 is broken much more easily. This easily broken portion 121 of V-groove may be also formed on the side of forming the conductor path 130, or at the back side of the crush plate 120, that is, the opposite side of the forming side of the conductor path 130. Anyway, when the crush plate 120 is crushed, the conduction of the conductor path 130 is cut off.

Figure 9:
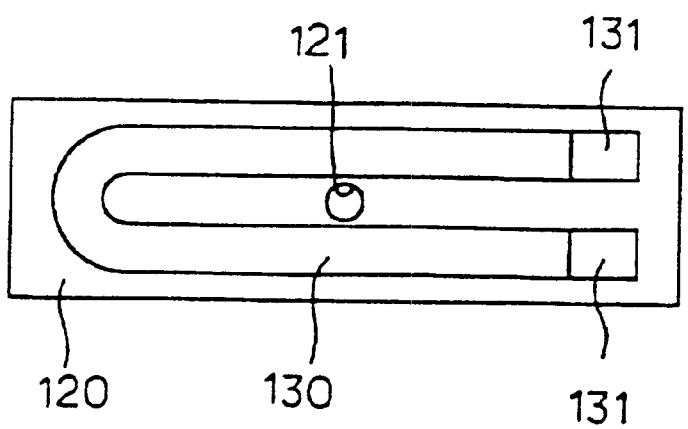
FIG. 9 is a schematic diagram showing a crush plate of a crush type pressure detecting device in a different embodiment of the invention, in which (a) is its plan view and (b) is its side view.

The easily broken portion 121 is not particularly specified in the structure as far as breakage of the crush plate 120 is promoted, and aside from the V-groove, for example, a hole may be opened in the central region of the crush plate 120 as in the case of the crush plate 120 shown in FIG. 9, or, although not shown, notches may be formed from both sides of the crush plate 120.

Figure 10:
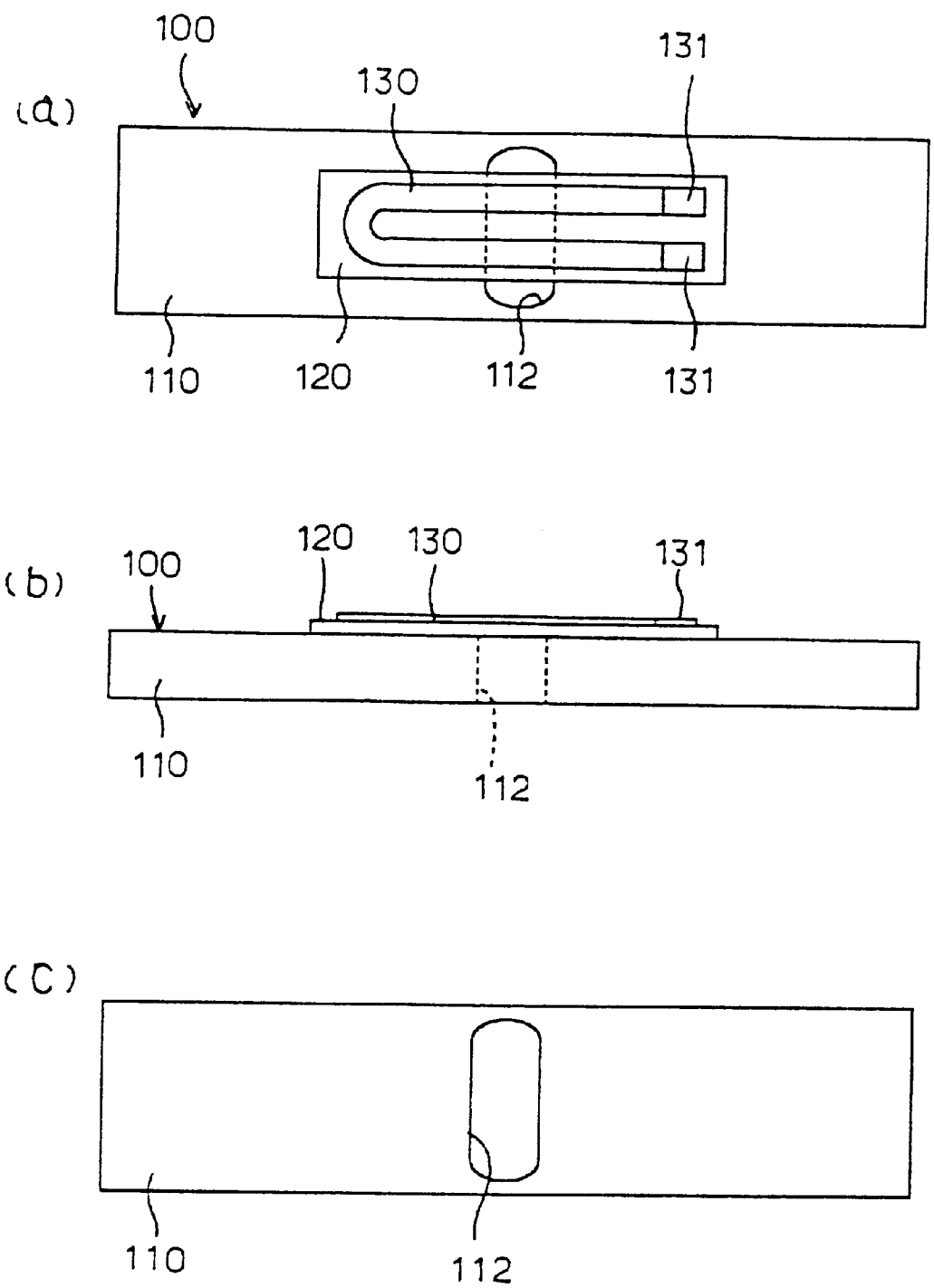
FIG. 10 is a schematic diagram showing a crush type pressure detecting device in a further embodiment of the invention, in which (a) is its plan view, (b) is its side view, and (c) is a plan view of its crush plate.

Further, as shown in FIG. 10, the crush plate 120 may be entirely held on the plate of the holder 110. The holder 110 is made of a same material as the holder 110 of both-side holding type. The crush plate 120 is affixed to the holder 110 by using adhesive or the like. In this way, since the crush plate 120 is placed on the holder 110, drop impact or vibration during transportation is not directly applied to the crush plate 120, so that it can be protected from breakage in the manufacturing process, transportation or storage.

In the holder 110, as shown in FIG. 10(c), a notch 112 of an elliptical form in a plan view is formed in its central region. This notch 112 is provided in the forming region of the conductor path 130. The notch 112 is intended so that breakage of the crush plate 120 may not be impeded by the holder 110, and it must be provided in the forming region of the conductor path 130. The size of the notch 112 is set properly depending on the object. Therefore, it is not indispensable for the holder 110, but may be provided as required.

Figure 11:
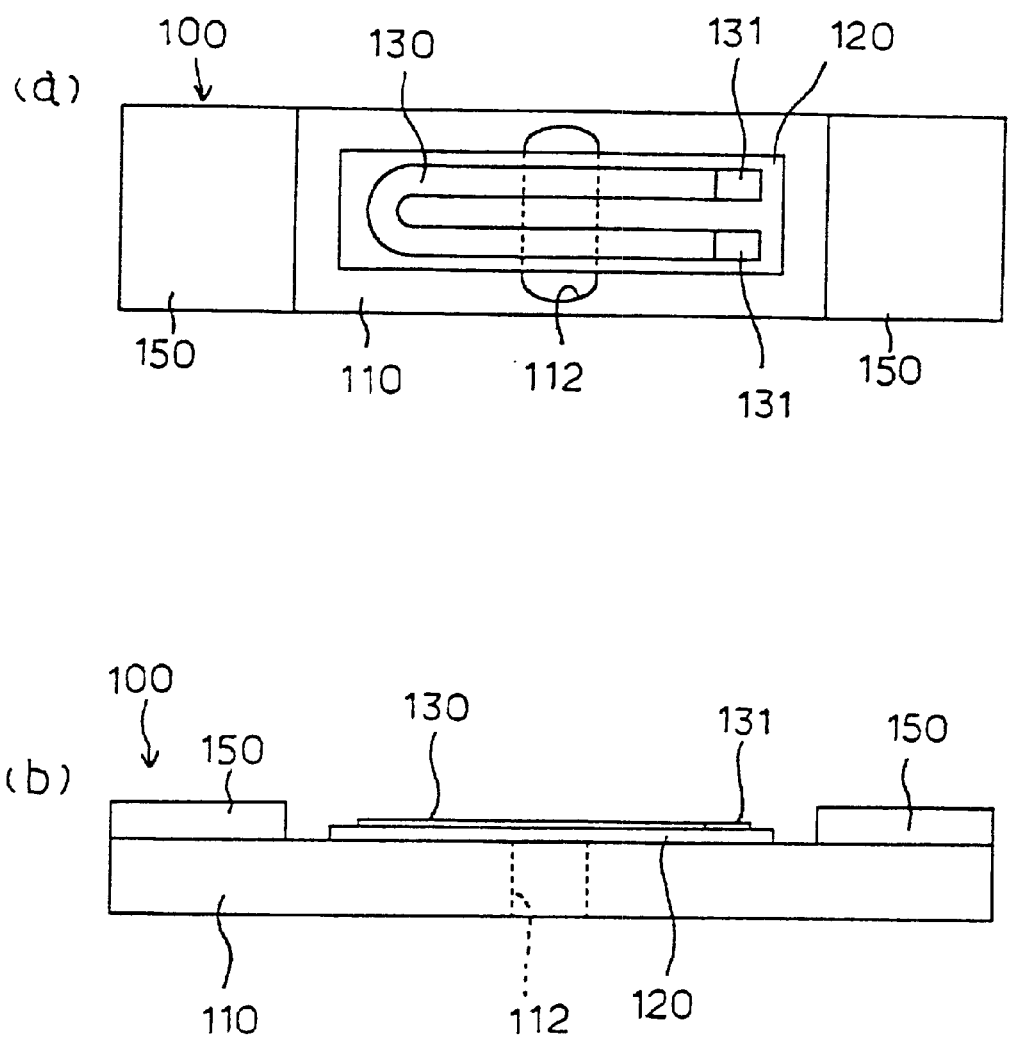
FIG. 11 is a schematic diagram showing a crush plate of a crush type pressure detecting device in a further different embodiment of the invention, in which (a) is its plan view and (b) is its side view.

Moreover, in the detecting device 100 shown in FIG. 11, covers 150 are placed at both ends of the holder 110 so as not to cover the crush plate 120. The cover 150 is made of same material as the holder 110, and is designed so that at least the surface of the cover 150 may be higher than the surface of the crush plate 120. By thus putting the covers 150 on the holder 110, protection from drop impact is further assured.

Figure 12:
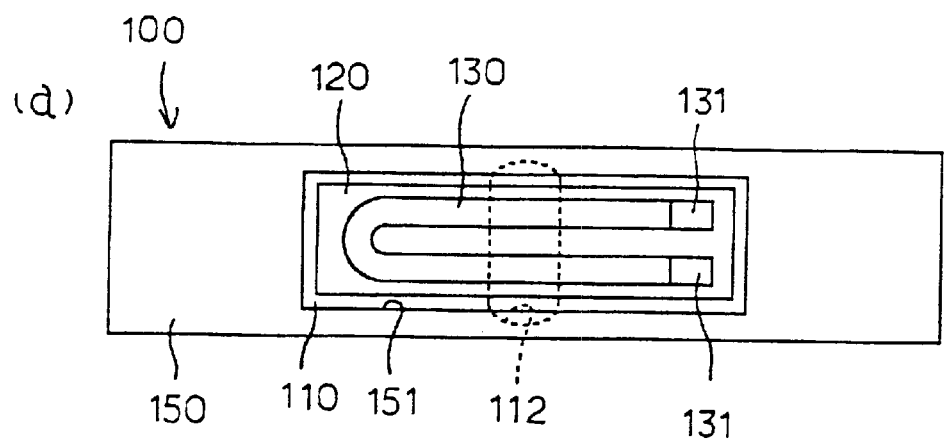
FIG. 12 is a schematic diagram showing a crush plate of a crush type pressure detecting device in a still further different embodiment of the invention, in which (a) is its plan view and (b) is its side view.
Figure 12:
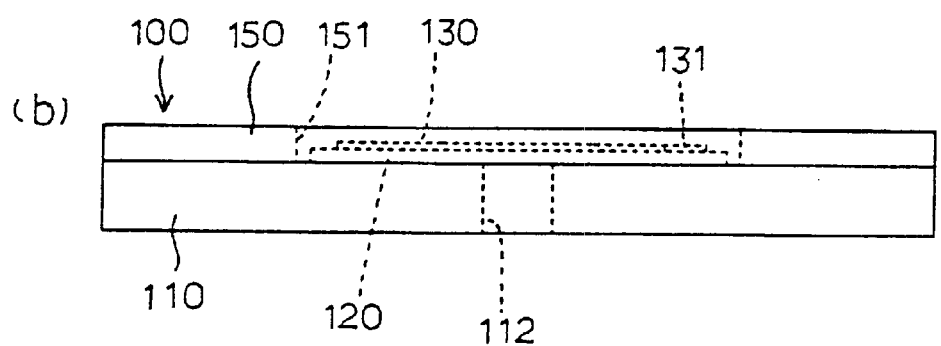

The structure of the cover 150 is not particularly specified so far as the breakage of the crush plate 120 is not impeded, and the cover 150 may be disposed by exposing the crush plate 120. In the detecting device 100 shown in FIG. 12, it is formed nearly in the same size as the holder 110, and is disposed at the opening 151 for exposing the crush plate 120. Thus, by exposing the crush plate 120, deformation of the crush plate 120 due to deformation of the object is not impeded, and worsening of the sensitivity due to the cover 150 can be prevented.

Figure 13:
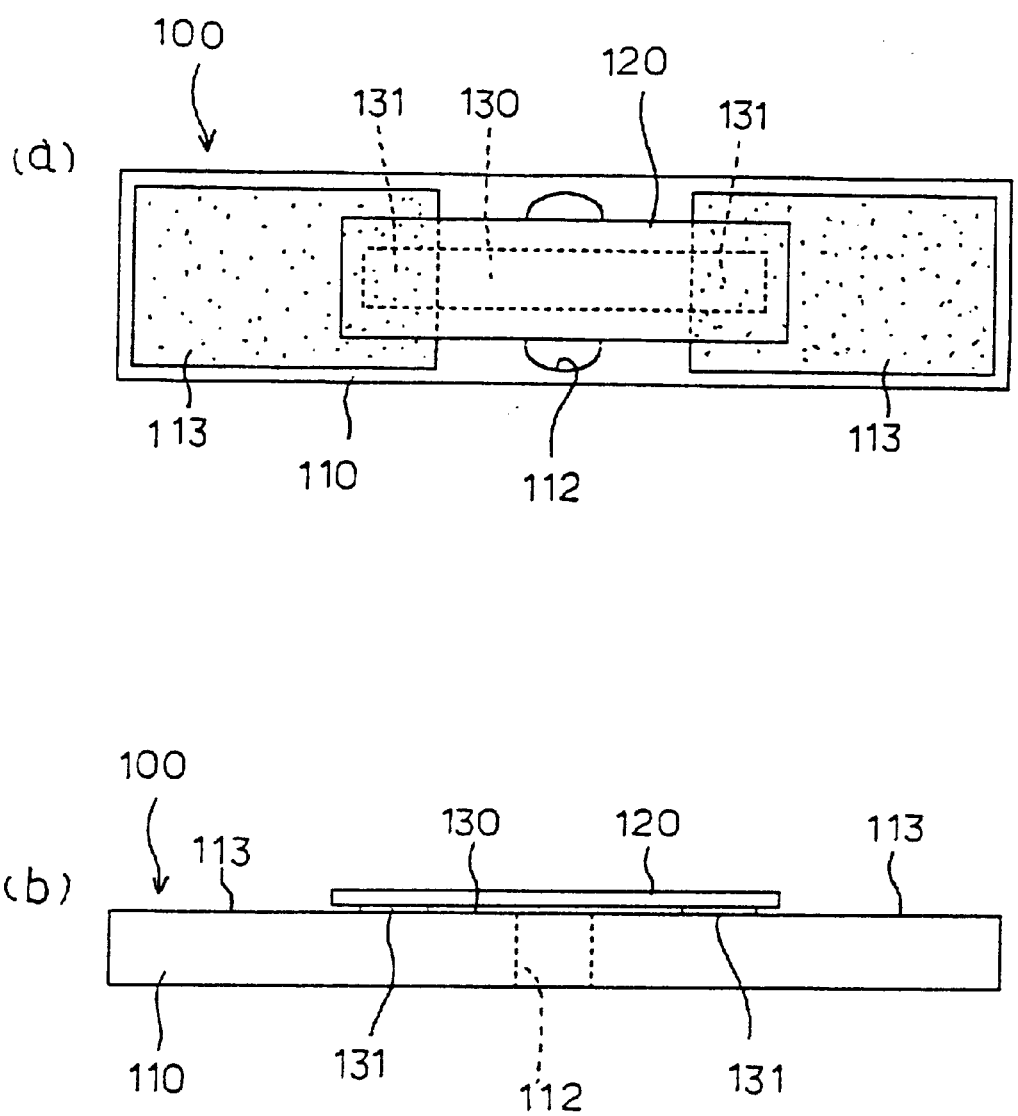
FIG. 13 is a schematic diagram showing a crush plate of a crush type pressure detecting device in other different embodiment of the invention, in which (a) is its plan view and (b) is its side view.

Further, in the detecting device 100 shown in FIG. 13, a printed board is used in the holder 110. In this printed board, a circuit pattern 113 is formed in the satin region shown in FIG. 13. Therefore, in this detecting device 100, keeping the conductor path 130 at the holder 110 side, by soldering the conductor path 130 and circuit pattern 113, they can be connected electrically. Thus, the electrode 131 can be led outwardly with ease.

Figure 14:
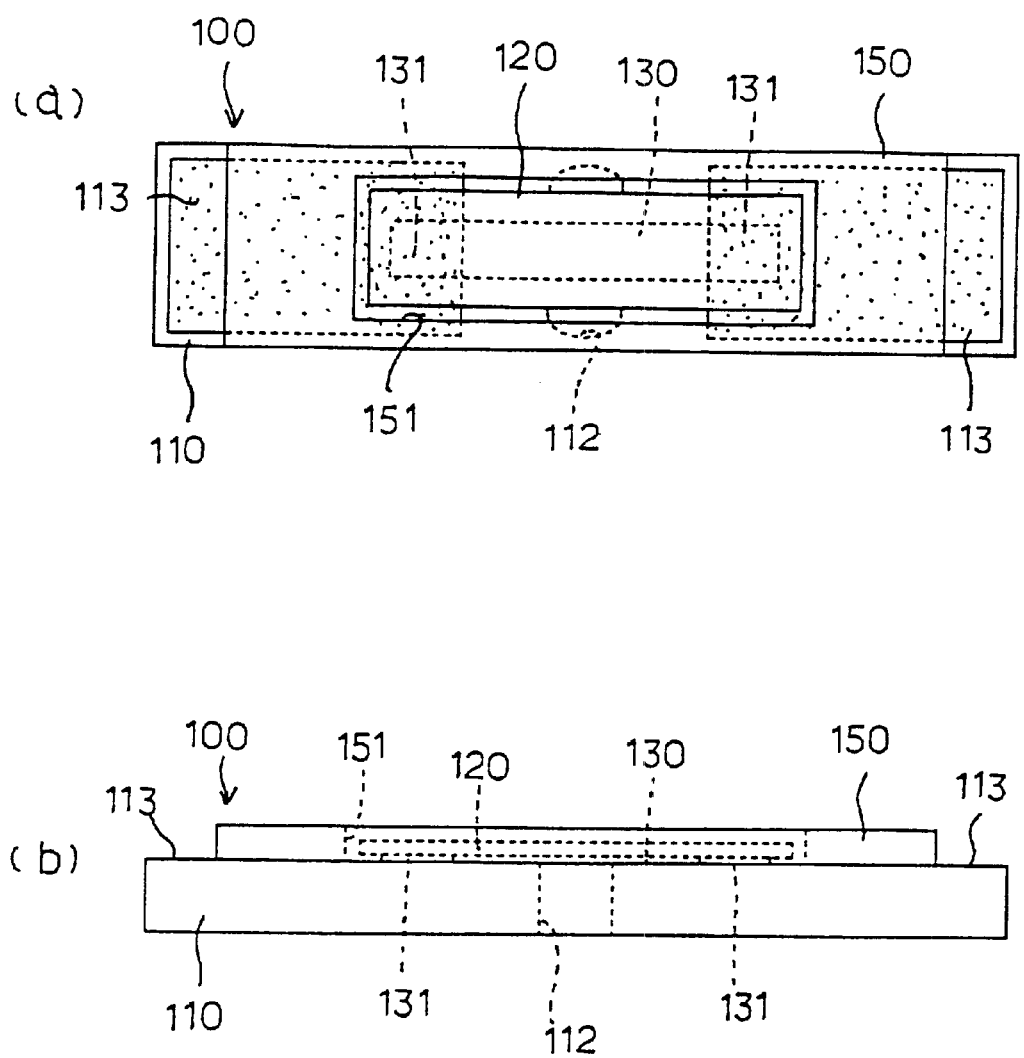
FIG. 14 is a schematic diagram showing a crush plate of a crush type pressure detecting device in still other different embodiment of the invention, in which (a) is its plan view and (b) is its side view.
Figure 15:
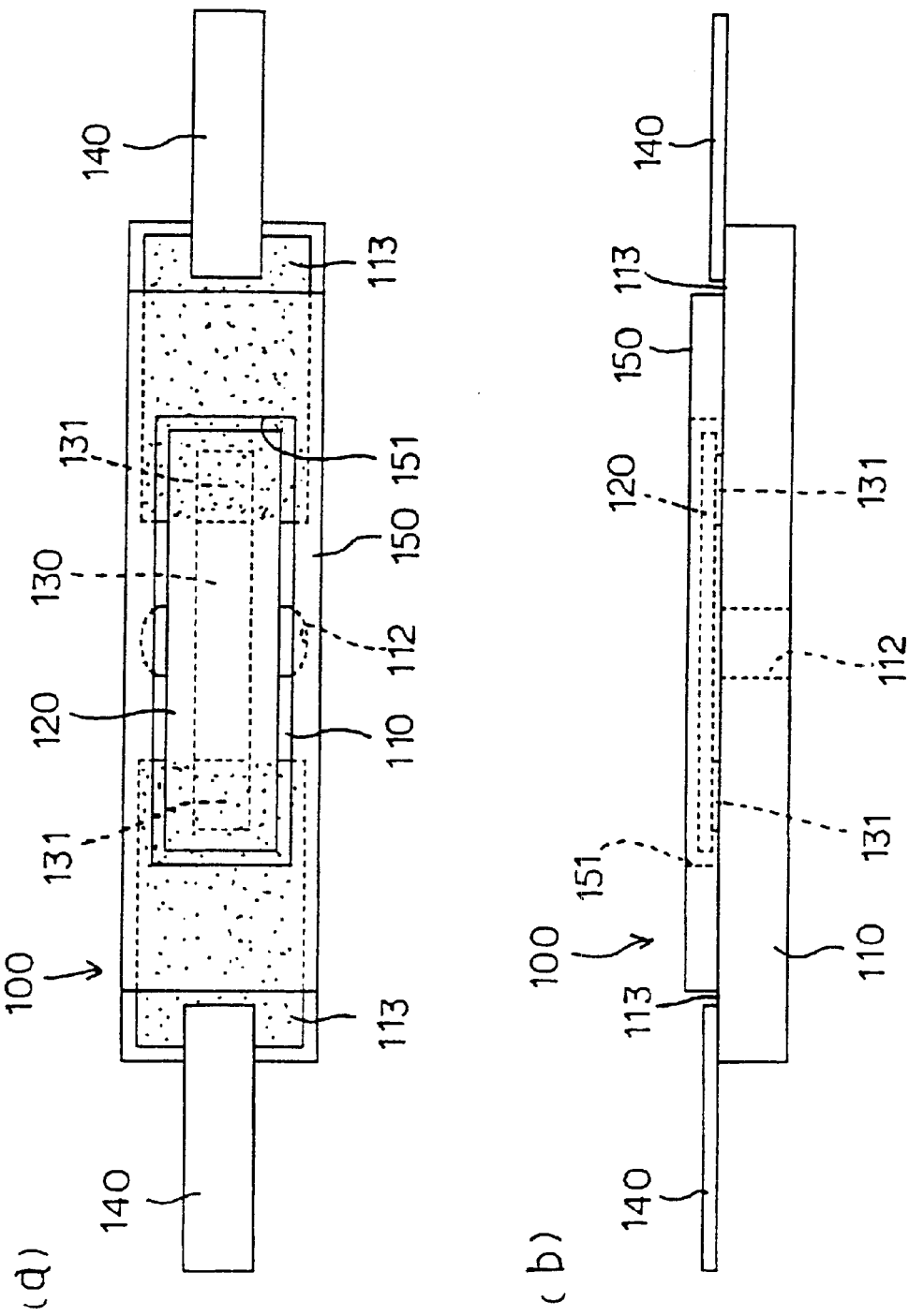
FIG. 15 is an explanatory diagram showing a manner of pulling out the electrode in the crush type pressure detecting device shown in FIG. 14, in which (a) is its plan explanatory diagram and (b) is its side explanatory diagram.

Using such printed board, too, a cover 150 can be disposed as shown in FIG. 14. In this case, it is preferred to form the cover 150 so as to expose the circuit pattern 113 on the printed board. When the circuit pattern 113 is exposed in this way, for example, the terminal plate 140 may be connected from the exposed portion of the circuit pattern 113 as shown in FIG. 15.

Thus, according to the invention, by forming the crush plate 120 by using a ceramic plate, the pressure detecting device 100 of simple structure and high sensitivity can be presented. The crush plate 120 is not limited to the ceramic plate, but, for example, a conductive carbon plate may be used. In this case, since the crush plate 120 itself is conductive, and the crush plate 120 itself serves also as the conductor path 130, so that the structure maybe further simplified. As a result, the crush type pressure detecting device 100 can be presented at further lower cost.

The rechargeable battery 200 having such crush type pressure detecting device 100 can be used in various applications, for example, portable telephones, mobile personal computers, and various portable electronic devices.

The crush type pressure detecting device 100 of the invention is used in the rechargeable battery 200 and can prevent explosion of the rechargeable battery 200, but its application is not limited to prevention of explosion alone. That is, by detecting cut-off of conduction of the conductor path 130 caused due to rupture of the crush plate 120, deformation of the object can be detected. Therefore, when used in various objects, by detecting cut-off of conduction of the conductor path 130, it can be used as deformation detecting sensor for detecting deformation of objects.

Next, an embodiment of the present invention will be described with reference to FIG. 16. A crush type pressure detecting device 100 shown in FIG. 16 comprises a crush plate 110 which could be broken by deformation stress and a conductor path 120 formed on the crush plate 110. The crush plate 110 is disposed, for example, on the side of a rechargeable battery case or the like, and is crushed due to deformation generated at the side of the case. The crush plate 110, in the present invention, is made of glass ceramics in order to render possible burning the crush plate together with a conductor path 120 as described in the following.

The thickness and size of the crush plate 110 are not subjected to any particular limitation and may be determined according to the object to be detected. The sensitivity of the crush plate 110 can be improved by making it thinner or longer sideways. In this case, using glass ceramics enables the manufacture of thinner plates while suppressing the generation of warp so that crush plate 110 of less than 0.3 mm in thickness can be easily obtained.

The conductor path 120 is an important element of the pressure detecting device. The breakage of crush plate 110 leads to the breakage of conductor path 120, causing the conduction of conductor path 120 to break. Accordingly, the conductor path 120 must be formed so as to be broken along with the breakage of the crush plate 110. The conductor path 120 may be formed, for example, by burning after printing conductive metal paste or by depositing conductive metal. As said conductive metal, it is preferred to use silver or copper whose burning temperature to form the conductor path 120 is nearly the same as the burning temperature to form the crush plate 110. It is because, by making the burning temperatures nearly same, simultaneous burning can be performed to form the crush plate 110 and conductor path 120 and consequently the manufacturing process may be simplified. That is, glass ceramics whose burning temperature is about 1,000° C. may be burned at about the same temperature as the silver paste or copper paste burning temperature.

Figure 16:
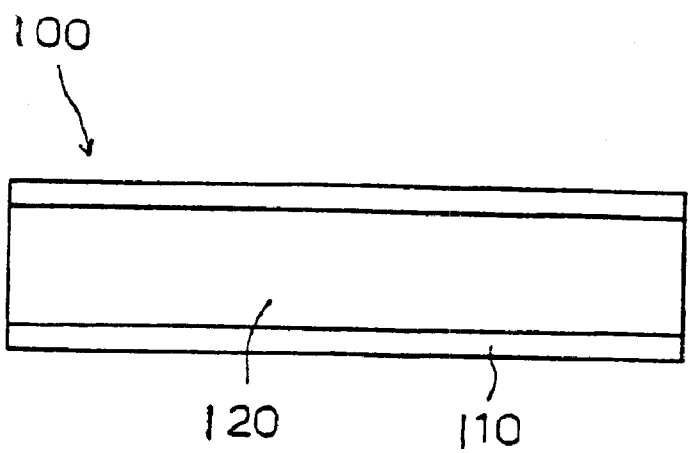
FIG. 16 is a schematic diagram showing a crush type pressure detecting device in an embodiment of the invention, in which (a) is its plan view and (b) is its side view.
Figure 16:
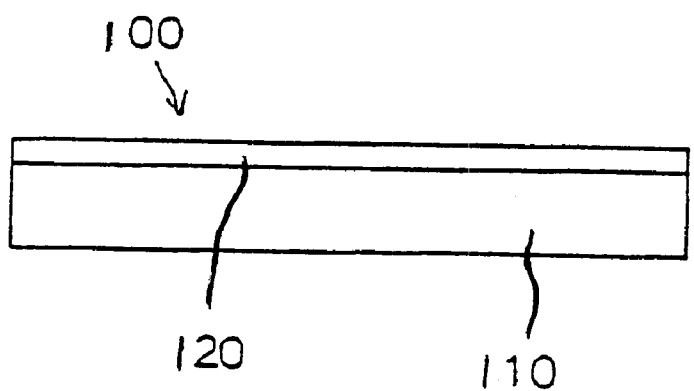

In the pressure detecting device shown in FIG. 16, said conductor path 120 is also linearly formed almost from end to end on the crush plate 110. Because the conductor path 120 must be precisely broken along with the breakage of the crush plate 110, it is formed at least in the central region (easily broken portion) of the crush plate 110. With the conductor path thus formed almost from end to end on the crush plate 110, the conductor path 120 is precisely cut off when the crush plate 110 is broken.

Thus, in the pressure detecting device of the invention, since the crush plate 110 is formed of glass ceramics, it is possible to use conductive metals such as copper or silver of low specific resistance, whose burning temperature is nearly the same as the crush plate burning temperature. Accordingly, the power consumed by the pressure detecting device will be reduced and the charging and discharging characteristics of the rechargeable battery provided with detecting device 100 can be improved. Furthermore, since simultaneous burning is possible to form the crush plate 110 and conductor path 120, and also the plate is more easily broken as compared with the case of a conventional pressure detecting device, the shape of a crush plate 110 can be simplified because it is, for example, unnecessary to provide slits for the adjustment of the sensitivity. As a result, the manufacturing processes are simplified, and the manufacturing cost can be reduced by using low-priced conductive metal. In addition, the crush plate 110 reduced in thickness remains hard to warp, therefore the thickness of the pressure detecting device 100 can be reduced and it contributes to the reduction in thickness of rechargeable batteries.

Figure 17:
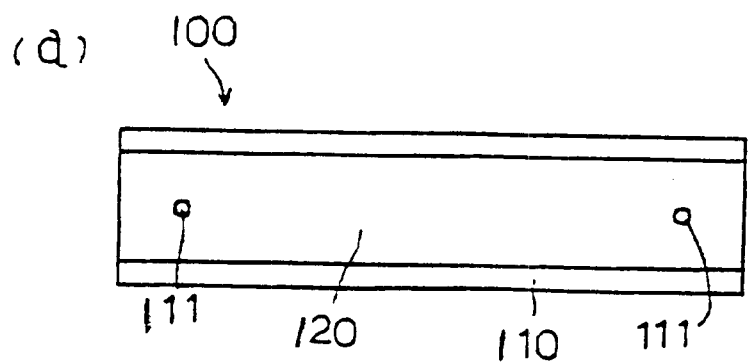
FIG. 17 is a schematic diagram showing a crush type pressure detecting device in still other embodiment of the invention, in which (a) is its plan view, (b) is its cross-sectional view (c) is its rear elevation.
Figure 17:
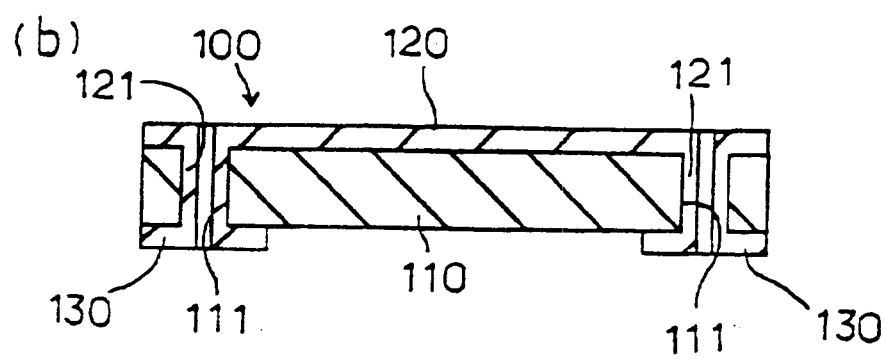
Figure 17:
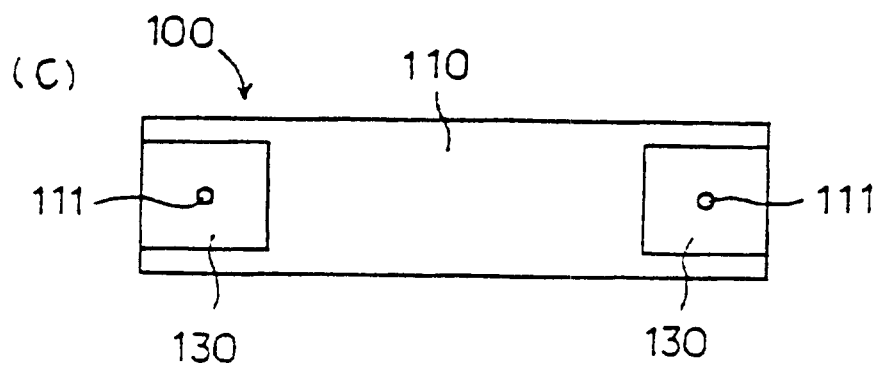

Next, in the pressure detecting device shown in FIG. 17, an electrode pad 130 is disposed on the back side of a crush plate 110. The electrode pad 130 is electrically connected to a conductor path 120 via a conductive portion 121 formed inside a through-hole 111 provided in the crush plate 110. The electrode pad 130 is for the connection to a protective circuit to detect the breakage of the conductor path 120. The electrode pad 130 is formed by burning conductive metal paste or by depositing conductive metal the same as for the conductor path 120. Also, the surface of the electrode pad 130 is gold-plated.

The conductive portion 121, as shown in FIG. 17 for example, is formed in a state of thin film, and it can be formed by burning conductive metal paste applied to the interior surface of the through-hole at the same time as the burning to form the conductor path 120 and the electrode pad 130. It is also possible to fill conductive metal paste into the through-hole 111 to form the conductive portion 121 over the whole interior surface of the same.

In such structure, when a pressure detecting device 100 is installed, electrical connection may be made on the side on which conductor path 120 is not formed. Accordingly, there will be no solder sticking to the conductor path 120, enabling the prevention of increase in resistance of the conductor path 120. As a result, when the detecting device is provided for a rechargeable battery or the like, the power consumed by the conductor path 120 will not increase and the influence to the charge and discharge of the rechargeable battery can be lessened. Also, gold-plating of the conductor path may ensure easy, precise soldering, and reduce the contact resistance. The environmental problem will also be relieved thereby improving the reliability of the rechargeable battery.

Figure 18:
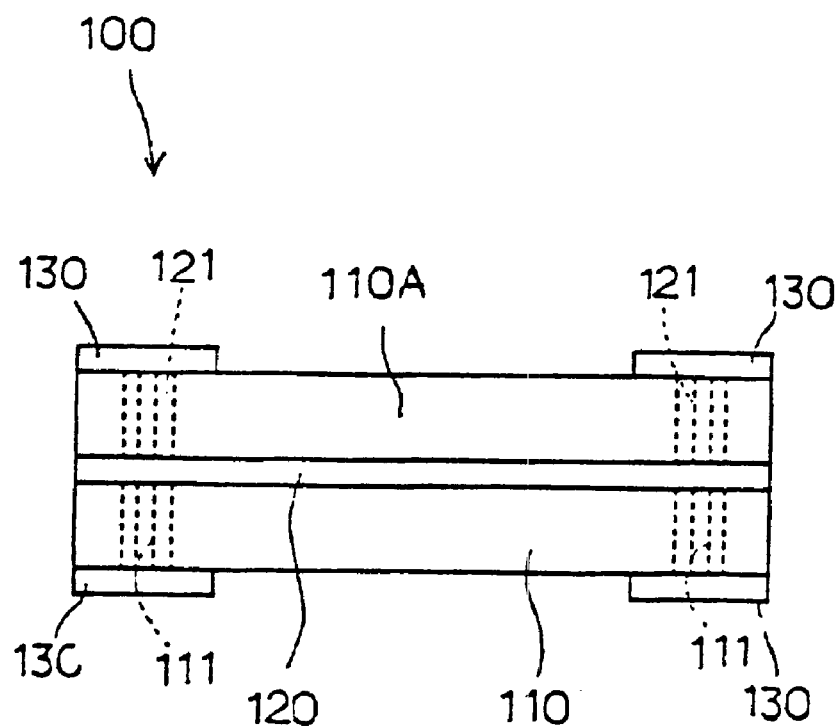
FIG. 18 is a schematic side view showing a crush type pressure detecting device in still another embodiment of the invention.

In a pressure detecting device 100 shown in FIG. 18, a second crush plate 110A on which conductor path 120 is not formed is placed on crush plate 110 with conductor path 120 formed thereon, and the conductor path 120 is sandwiched between a pair of crush plates 110 and 110A. Both of the two crush plates 110 and 110A are made of glass ceramics, and also in this case, metal paste is printed on a glass ceramic plate prior to burning to form a conductive pattern or conductor path 120, and after that, by burning at the predetermined temperature, the pressure detecting device 100 having said sandwiched structure can be obtained through single burning process.

In said pressure detecting device 100, an electrode pad 130 is disposed on the back side of two crush plates 110 and 110A respectively, and each electrode pad 130 is electrically connected to the conductor path 120 by a conductive portion 121 formed on the inner surface of through-hole 111.

In the pressure detecting device 100, the whole electrode path 120 is sandwiched between two crush plates 110 and 110A, therefore solder sticking trouble that might be otherwise generated during installation may be prevented and also such structure is excellent in terms of environmental protection and the operation of the device is stable even in use for a long period of time or under severe conditions. Also, the detecting device is same in face and back structure, and can be installed without paying attention to its direction or position thereby insuring better workability.

Also, using glass ceramics enables the reduction in thickness of two crush plates 110 and 110A. Accordingly, even when the two crush plates 110 and 110A are placed one upon another, the resultant thickness is same as in the case of using alumina ceramics, and it may improve the reliability without causing any influence to the thickness of the rechargeable battery.

The description of the present embodiment has referred to the case of disposing four electrode pads 130 on each back side of two crush plates 110 and 110A. However, it is not always necessary to dispose four electrode pads 130 and, needless to say, it is allowable to dispose a pair of electrode pads 130 on only one of the crush plates 110 and 110A.

Figure 19:
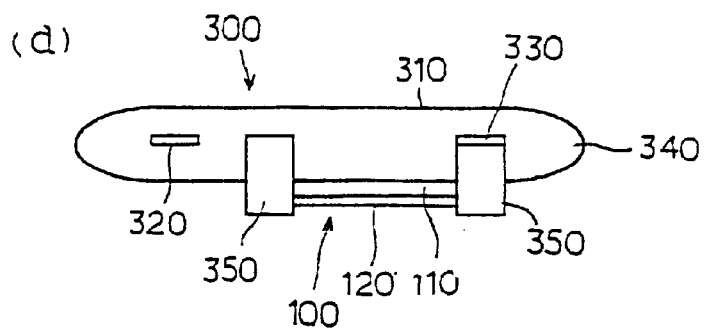
FIG. 19 is a schematic diagram showing a rechargeable battery in an embodiment of the invention, in which (a) is its plan view, (b) is its front elevation and (c) is its side view.
Figure 19:
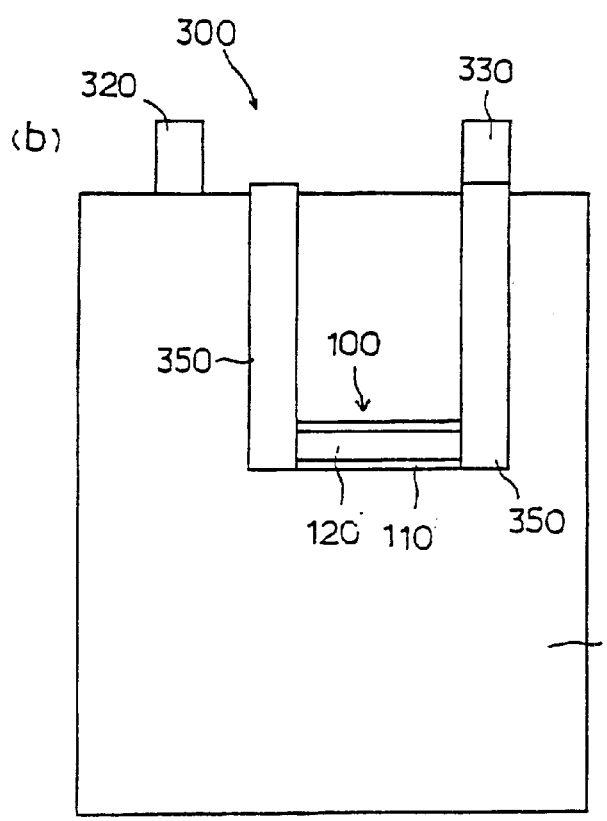
Figure 19:
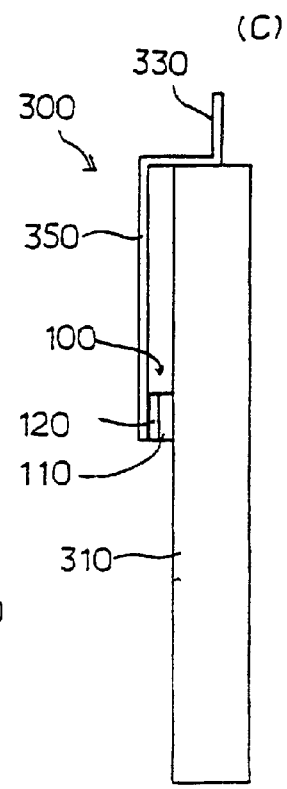

These pressure detecting devices 100 are to be installed in objects which could be deformed due to internal pressures such as rechargeable batteries involving the danger of explosion. FIG. 19 is a schematic diagram showing a rechargeable battery 300 comprising a pressure detecting device 100 as shown in FIG. 16. The rechargeable battery 300 has a case 310 filled with liquid electrolyte, and the case 310 is internally provided with a positive (or negative) collector (not shown). The case 310 itself is conductive and also serves as a negative (or positive) electrode, and a laminate film case is used as the case.

The laminate film case is made into a kind of bag from laminate film formed by affixing conductive metal film such as aluminum foil or the like to the inner surface of plastic film. Accordingly, the case 310 itself is conductive and also serves as a negative (or positive) electrode. The upper end opening of the case 310 is enclosed with a seal member 340 formed of insulating material such as plastics and is internally filled with liquid electrolyte. A thin-plate output electrode 320 which serves as a negative electrode is disposed in a protrusive manner on the seal member 340, the end of which is electrically connected to the case 310 (conductive metal film) inside the case through the seal member 340, and the negative electrode is led outwardly.

Also, the rechargeable battery 300 is provided with a pair of conductive thin-plate (or film) type mounting members 350 on which the pressure detecting device is to be installed. In one of the mounting members 350, one end of it is electrically connected to the collector through the seal member 340, and the other end is electrically connected to the conductor path 120 of the pressure detecting device. In the other mounting member 350, it is bent at the upper peripheral edge of the case 310 and secured to the top surface of the seal member 340 nearly at the center thereof and is further bent upwardly to form an output electrode 330 which serves as a positive electrode. At that time, the bending operation is to be performed in such a way that the mounting member 350 is not short-circuited with the case 310.

The pressure detecting device 100 is installed on the case 310 by the mounting members 350, but it is necessary to transmit the deformation of case 310 precisely to the crush plate 110, and preferably the back side of crush plate 110 is secured to the face side of case 310 by using adhesive or the like.

In the rechargeable battery 300, as the liquid electrolyte is decomposed due to overcharge for instance, the internal pressure is increased causing the case 310 to swell outwardly, and then deformation stress will be applied to the crush plate 110. When deformation stress is further applied, the crush plate 110 is broken as it becomes unable to withstand the stress. Then the conductor path 120 is also broken, causing the conduction between the collector and the output electrode 330 (positive) to break and the battery to stop charging. Thus, the explosion of rechargeable battery 300 can be prevented.

Particularly, in the rechargeable battery 300 using a laminate film case, the battery is very thin (2 or 3 mm in thickness) and is greatly influenced by the thickness of the pressure detecting device 100. Accordingly, when a thick pressure detecting device as in the prior art is used, it will arouse fear of losing the peculiarity of the laminate film case. In this respect, the effects of the present invention can be further displayed by applying the pressure detecting device of the present invention to rechargeable battery 300 using a laminate film case.

Figure 20:
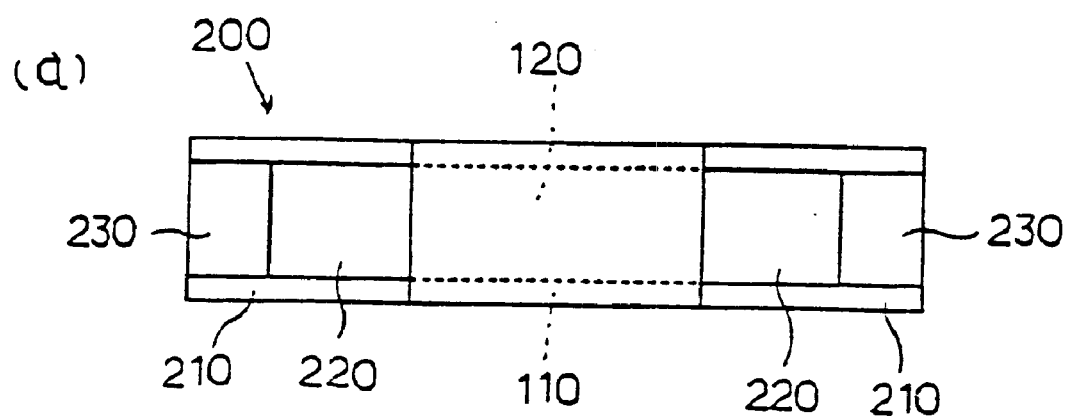
FIG. 20 is a schematic side view showing a crush type pressure detecting device in another different embodiment of the invention, in which (a) is its plan view and (b) is its side view.
Figure 20:
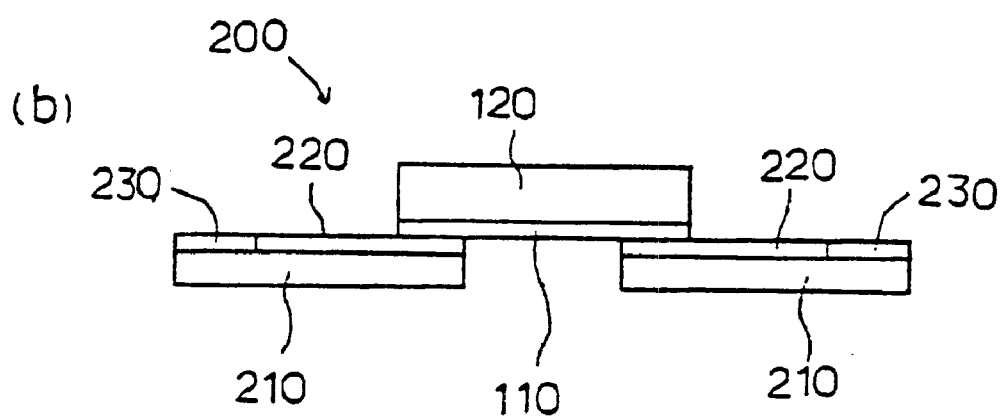

Another different embodiment of the present invention will be described with reference to FIG. 20. A pressure detecting device 200 shown in FIG. 20 comprises a crush plate 110 that could be broken by deformation stress, a conductor path 120 formed on a crush plate 110, and a pair of holders 210 which hold at the sides the crush plate 110.

The crush plate 110 is made up of glass ceramics, and both ends of pressure detecting device 100 shown in FIG. 16 or FIG. 18 are held at the sides by holder 210. In the pressure detecting device 200, since the deformation of the object is transmitted to the crush plate 110 through the holder 210, even when the deformation is very slight, a great deal of deformation stress will be applied to the crush plate 110 which is then easily broken. Therefore, the sensitivity of the pressure detecting device is higher as compared with the aforementioned pressure detecting device, and in case the sensitivity remains unchanged, the size of the crush plate 110 can be shortened. As for the crush plate 110 and conductor path 120, the description in detail is omitted here because the embodiment is completely same the aforementioned embodiment.

Since the holder 210 must be able to transmit the deformation of the object to the crush plate 110 as it is, preferably material being excellent in rigidity is employed to meet the purpose. From the viewpoint of reducing the thickness of the pressure detecting device 200, it is preferable to use a thin plate such as a plastic plate, alumina ceramic plate, glass ceramic plate and printed circuit board. Also, it is desirable to use insulating material for the assurance of insulation against the conductor path 120 and the object installed. Particularly, in order to facilitate the electrical connection between the conductor path 120 and the protective circuit, a printed circuit board is preferably employed.

On each holder 210 comprising the printed circuit board is disposed an electrode pad 230 and a circuit pattern 220 electrically connected to said electrode pad 230. Also, said circuit pattern 220 is provided with a connection pad (not shown) which is connected to the conductor path 120. The circuit pattern 220 can be simply obtained by etching the conductive metal film formed on the printed circuit board.

The size and thickness of the holder 210 are not subjected to any particular limitation, but preferably holders as much small and thin as possible are employed for the purpose of miniaturization. Also, the sensitivity can be improved by increasing the interval between paired holders 210, but it causes easier breakage. Therefore, the interval is preferably determined in accordance with the required sensitivity and reliability.

In the pressure detecting device 200, the crush plate 110 is held at the sides by a pair of holders 210, just like being placed on the respective sides of the holders. Also, each end of the conductor path 120 is electrically connected to the connection pads on the holders 210. In that case, various methods are available for holding the crush plate 110, for example, soldering, resistance welding, ultrasonic welding or laser welding, by which the crush plate 110 can be held by holders 210 by welding the conductor path 120 to the connecting pads.

By employing such configuration, the crush plate 110 can be shortened in size and the amount of expensive ceramics used can be decreased. As a result, the manufacturing cost of the pressure detecting device 200 may be reduced. Also, with the length of crush plate 110 set to less than ⅓ of the overall length of pressure detecting device 200, it is possible to manufacture pressure detecting device 200 which is strong against drop impact, able to withstand slight deformation stress and may operate at the desired level of deformation.

Needless to say, it is possible to use the crush plate 110 with the electrode pad formed on the back side as shown in FIG. 17 or with the conductor path 120 sandwiched between two crush plates 110 as shown in FIG. 18.

Figure 21:
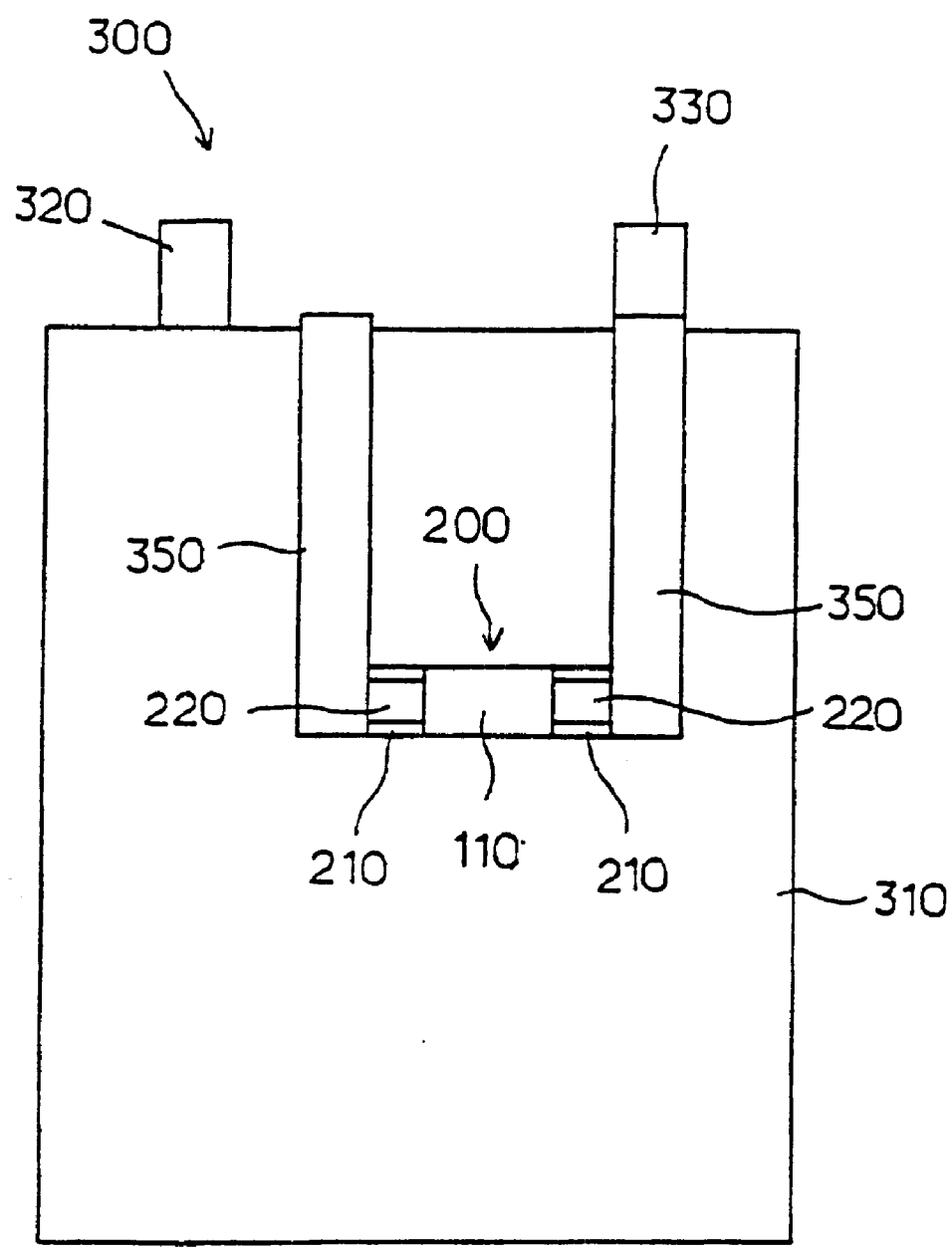
FIG. 21 is a schematic front elevation showing a rechargeable battery in another embodiment of the invention.
Figure 22:
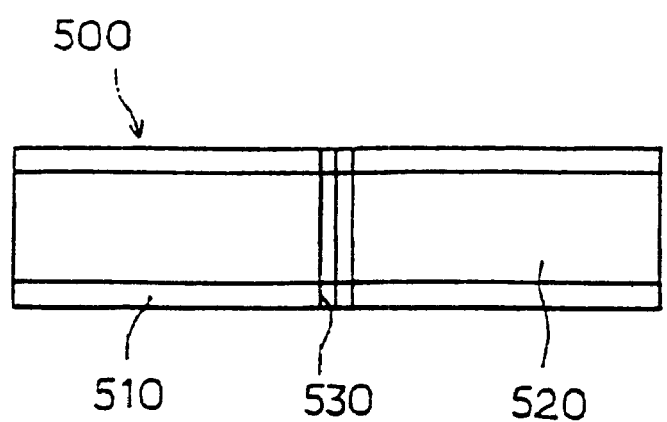
FIG. 22 is a schematic diagram showing a conventional crush type pressure detecting device, in which (a) is its plan view and (b) is its side view.
Figure 22:
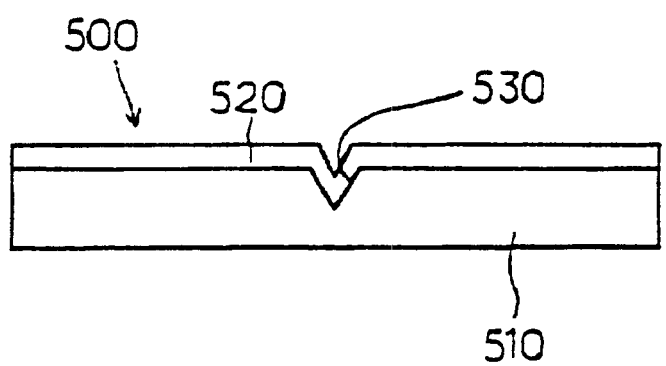

Also, said pressure detecting device 200 is, as shown in FIG. 21, provided in a rechargeable battery 300 or the like, but in the rechargeable battery 300, a mounting member 350 is electrically connected to electrode pad 230 formed on holder 210. In such configuration, the thickness of mounting member 350 is nearly equal to or less than the thickness of crush plate 110 and conductor path 120. Consequently, the pressure detecting device 200 can be formed, which is nearly the same in thickness as a detecting device not using holder 410, and thus the sensitivity can be improved without increasing the thickness.

As stated above, in crush plate type pressure detecting devices 100 and 200 of the present invention, the crush plate 110 is made of ceramics and therefore conductor path 120 can be formed by burning together with the crush plate 110 and, moreover, conductive metal paste of relatively inexpensive silver or copper can be used. As a result, the pressure detecting devices 100 and 200 can be provided at low cost.

Also, since glass ceramics is employed, the crush plate 110 which is thin and hard to warp can be obtained. So, thin type pressure detecting devices 100 and 200 can be manufactured. For example, by applying this type of detecting device to a rechargeable battery 300, reduced in thickness, such as lithium polymer battery and lithium ion battery, safe and thinner rechargeable battery 300 can be provided at low cost.

Particularly, in the rechargeable battery 300 using a laminate film case, reduced in thickness, it is possible to minimize the influences by the pressure detecting devices 100 and 200 so that the effects of the present invention will be further displayed.

In addition, by using thin-type holders 210 such as a printed circuit board in order to hold at the sides the crush plate 110, it is possible to reduce the amount of expensive ceramics used and to realize the provision of pressure detecting device 200 which is lower in price and higher in sensitivity.

In this way, the sensitivity can be improved by making the crush plate 110 longer as the crush plate 110 is held at its sides, and on the other hand, by making the crush plate 110 shorter, it is possible to manufacture the pressure detecting device 200 which is able to withstand slight deformation stress and is very strong against drop impact, and thus the freedom of design will be remarkably enhanced. As a result, the pressure detecting device 200 which is high in sensitivity and excellent in reliability can be provided.

The rechargeable battery 300 comprising the crush type pressure detecting device 100 or 200 may be used in various applications. For example, it can be used in various types of portable electronic devices including portable telephones and portable computers.

The crush type pressure detecting devices 100 and 200 of the present invention, when used in the rechargeable battery 300, can prevent the explosion of the battery by cutting off the charging/discharging circuit beforehand, but the use of the detecting device is not limited to only prevention of explosion. That is, it can also be used as a pressure sensor which detects the conduction break of the conductor path that takes place when the crush plate is broken or as a deformation sensor which detects the deformation of objects.

Effects of the Invention

Since the crush type pressure detecting device of the invention comprises a crush plate forming a conductor path, a holder for holding the crush plate, and a pair of electrodes conducting with the conductor path, pressure deformation can be transmitted from the holder to the crush plate. Therefore, the crush plate 120 can be fabricated in a small size without lowering the sensitivity. As a result, if expensive ceramics is used in the crush plate, the crush type pressure detecting device can be presented at low cost.

Moreover, since the crush plate is small, the resistance of the conductor path on the ceramics is low, and the current loss is small. As a result, the life of the rechargeable battery is extended, and the charging efficiency is improved. The warp of the crush plate is less, and malfunction is rare, and the reliability of the detecting device is enhanced.

By forming an easily broken portion such as V-groove crossing with the conductor path on the crush plate, the crush plate is easily broken. Hence, the sensitivity of the detecting device is enhanced.

By holding the crush plate by the holder at both sides, the crush plate is easily broken from the center, and the pressure deformation can be detected precisely.

The crush plate can be also placed on the plate of the holder. At this time, by forming a notch at least in part of the conductor path forming region of the crush plate of the holder, lowering of the sensitivity can be prevented.

By placing a cover on the holder with the crush plate exposed, damage by drop impact in manufacturing process, transportation or storage can be prevented, and the yield is improved.

By forming the conductor path in U-shape, the conductor path becomes to be easily broken, and the breakage can be detected securely. As a result, the detection sensitivity can be enhanced.

By fabricating the crush plate by using ceramics, breakage due to pressure deformation can be detected securely, or when made of conductive material such as carbon and serving also as conductor path, the number of components is decreased, and it can be presented at lower cost.

Using a printed board as the holder, the structure is much simplified, and it is easy to connect with the electrode.

Thus, the crush type pressure detecting device of the invention is simple in structure and is presented at low cost. Accordingly, by using such crush type pressure detecting device, the safe rechargeable battery and the portable electronic device using such rechargeable battery can be lowered in cost.

Other crush type pressure detecting device of the invention is provided with a conductor path formed on a crush type plate which could be broken by deformation stress. Since the crush plate is made of ceramics, it is hard to warp and allows the manufacture of thinner crush plates. Accordingly, the pressure detecting device can be reduced in thickness. Also, as stated later, by using conductive metal paste of low specific resistance such as silver or copper that is relatively inexpensive, the burning can be performed at nearly the same temperature as the glass ceramics burning temperature to form the crush plate and the conductor path at the same time. Furthermore, since the strength of ceramics itself is low, it is not necessary, for instance, to slit the crush plate as is required in the use of alumina ceramics, and the sensitivity can be almost determined by regulating the size of the crush plate, making it easier to adjust the sensitivity.

Also, an electrode pad is disposed on the other side opposite the conductor path of the crush plate, and there is provided conduction between the conductor path and the electrode through a conductive portion formed in the through-hole created in said crush plate, and then the electrode pad is electrically connected to the protective circuit on the other side opposite the conductor path. As a result, increase in resistance of the conductor path due to solder sticking can be prevented and the installation work can be performed without lowering the performance.

Moreover, deterioration of the conductor path can be prevented by placing another crush plate on the crush plate with the conductor path formed thereon, and also lowering of the performance can be prevented in the use for a long period of time or under bad environment. Also, since thin crush plates can be manufactured, even when a crush plate is placed on another crush plate, the thickness remains almost same as that of a crush plate using alumina ceramics, therefore the safety and reliability can be enhanced without increasing the thickness of the rechargeable battery.

Another crush type pressure detecting device of the invention comprises a crush plate which could be broken by deformation stress, a conductor path formed on the crush plate, and a pair of holders which hold at the sides the crush plate, and it is characterized in that the crush plate is made of glass ceramics, enabling the manufacture of thin crush plates. Also, since the crush plate is held at the sides, the sensitivity can be further improved. As a result, the crush plate is thinner than that obtained with use of alumina ceramics, and its sensitivity can be more enhanced without increasing the plate thickness as compared with the case of using no holder. The same as in the aforementioned first invention, since the crush plate and conductor path can be formed by simultaneous burning and also the crush plate can be shortened, the amount of ceramics used may be reduced, greatly contributing to the reduction of the manufacturing cost.

In that case, the pressure detecting device can be reduced in thickness by using, as the holder, thin plates such as a printed wiring board, glass ceramic plate, and alumina ceramic plate. Also, by using a printed circuit board as the holder, its electrical connection to the conductor plate and to the protective circuit can be made by utilizing the circuit pattern thereon.

Also, by setting the length of the crush plate to less than ⅓ of the overall length of the crush type pressure detecting device, the pressure detecting device may resist high impact and is not damaged by slight deformation and is able to operate at the desired level of deformation.

In this way, in the crush type pressure detecting device of the present invention, the crush plate is formed of glass ceramics, and it is possible to form the conductor path by burning conductive metal paste whose burning temperature is nearly the same as the crush plate burning temperature. As a result, the manufacturing processes may be simplified, silver or copper that is low in specific resistance and inexpensive can be used, and therefore highly reliable and sensitive pressure detecting devices can be provided at low cost.

These crush type pressure detecting devices, when adapted to a rechargeable battery for example, the safety of the battery is improved and its thickness is further reduced, and highly reliable low-priced rechargeable batteries may be provided. Also, by applying rechargeable batteries comprising these pressure detecting devices to various types of portable electronic devices, a great contribution can be made in the miniaturization and price reduction of portable electronic devices.

Particularly, a rechargeable battery using a laminate film case is less in thickness and when it is used in said rechargeable battery, the influence caused by the pressure detecting device can be minimized, and the effect of the present invention will be further displayed.

INDUSTRIAL APPLICABILITY

The present invention can be applied to a portable telephone, a video camera and other portable electronic devices, and is usable as a rechargeable battery having a pressure detecting device.

What is claimed is:

1. A crush type pressure detecting device comprising a crush plate forming a conductor path thereon, a holder for holding said crush plate, and a pair of electrodes conducting with said conductor path, wherein said holder is a printed board.

2. The crush type pressure detecting device of claim 1, wherein a breakable portion is provided in said crush plate.

3. The crush type pressure detecting device of claim 2, wherein said easily broken portion is a V-groove crossing with the conductor path of said crush plate.

4. The crush type pressure detecting device of claims 1, 2 or 3, wherein said holder holds said crush plate at both sides.

5. The crush type pressure detecting device of claim 1, 2 or 3, wherein said holder is a plate, and said crush plate is put on this holder.

6. The crush type pressure detecting device of claim 5, wherein a notch is formed in at least a part of the conductor path forming region of said crush plate of said holder.

7. The crush type pressure detecting device of claim 1, wherein a cover is placed on said holder by exposing the crush plate.

8. The crush type pressure detecting device of claim 1, wherein said conductor path is formed in a U-shape.

9. The crush type pressure detecting device of claim 1, wherein said crush plate is made of ceramics.

10. The crush type pressure detecting device of claim 1, wherein said crush plate is conductive, and serves also as conductor path.

11. A crush type pressure detecting device, being a crush type pressure detecting device comprising a conductor path on a crush plate which could be broken by deformation stress, wherein an electrode pad is disposed on another side opposite the conductor path of said crush plate, and said conductor path conducts with said electrode through a conductive portion formed inside a through-hole created in said crush plate.

12. A crush type pressure detecting device of claim 11, wherein another crush plate is placed on the crush plate with said conductor path formed thereon.

13. A crush type pressure detecting device, being a crush type pressure detecting device comprising a crush plate which could be broken by deformation stress, a conductor path formed on said crush plate, and a pair of holders which hold said crush plate, wherein a electrode pad is formed on a printed circuit board being a holder and said electrode pad conducts with said conductor path through a circuit on said printed board.

14. A crush type pressure detecting device of claim 13, wherein said holder is formed from a sheet of material, said material comprising a printed circuit board, glass ceramic plate, or alumina ceramic plate.

15. A crush type pressure detecting device of claim 14 or 13, wherein the length of said crush plate is less than ⅓ of the overall length of a crush type pressure detecting device.

16. A crush type pressure detecting device of claim 11, 14, or 13, wherein said conductor path is formed by burning a conductive metal paste whose burning temperature is the same as the crush plate burning temperature.

* * * * *